Figure 1:
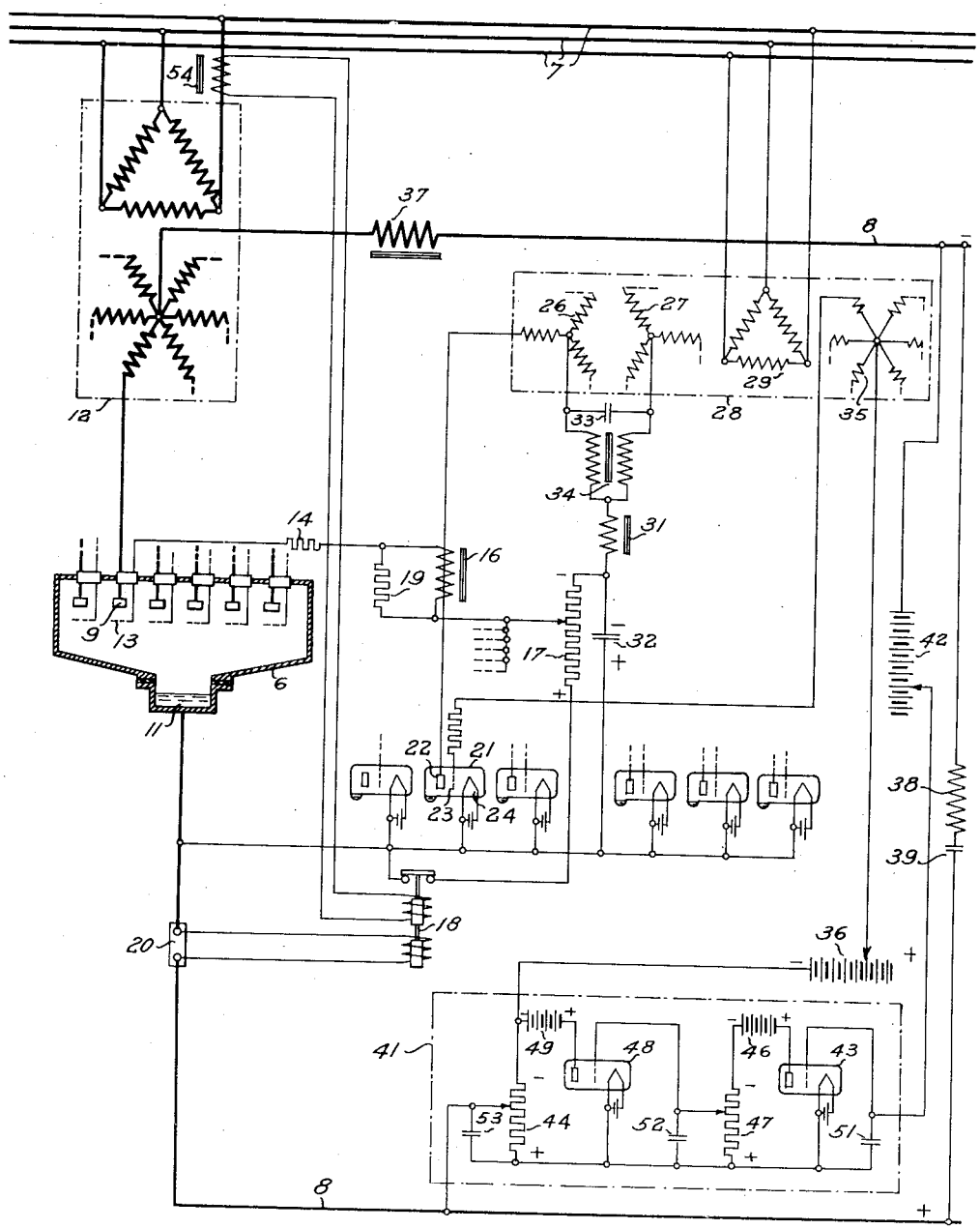

May 31, 1938.                C. EHRENSPERGER                2,119,130
                        ELECTRIC VALVE CONTROL SYSTEM
                        Filed Oct. 12, 1935        3 Sheets-Sheet 2

Inventor
C. Ehrensperger
by [Attorney signature]
Attorney

Patented May 31, 1938

2,119,130

UNITED STATES PATENT OFFICE 2,119,130

ELECTRIC VALVE CONTROL SYSTEM

Charles Ehrensperger, Baden, Switzerland, assignor to Aktiengesellschaft Brown Boveri & Cie., Baden, Switzerland, a joint-stock company of Switzerland Application October 12, 1935, Serial No. 44,671
In Germany October 15, 1934

22 Claims. (Cl. 175—363)

This invention relates in general to improvements in electric valve control systems, and more particularly to means for regulating the flow of current through an electric valve during normal operation thereof and for rendering the valve non-conductive upon occurrence of abnormal operating conditions in the circuit thereof.

Electric valves are frequently utilized in connection with suitable inductive apparatus to perform current converting operations of different natures. When alternating current is to be rectified and the flow of rectified current is not to be continuously regulated, it is not necessary to control the conductivity of the valve producing the current rectification. For continuously regulating the flow of direct current, and for obtaining all current converting operations other than rectification, it is necessary to control the conductivity of the valve, such result being preferably obtained by means of control electrodes. The controlling operation is obtained by causing the control electrode to become alternately positive and negative with respect to the so-called critical potential of the valve.

In valves of large current rating and which are required to carry current of variable intensity, such critical potential varies with the operating conditions of the valve and, to obtain a positive control of the valve, it is advantageous to impress on each control electrode thereof an alternating potential of substantially rectangular wave form. Such potential is preferably obtained in some relation with a flow of periodic current of substantially rectangular wave form through an auxiliary electric valve supplying an inductive circuit containing a resistor bridged by a capacitor. A negative unidirectional potential component may then also be impressed on the control electrode from a point of the resistor, and the valve may be rendered non-conductive by interrupting the flow of current through the resistor by means of a relay. The operation of the auxiliary valve is preferably regulated by a static regulator responsive to an operating condition of the main valve and producing a control voltage, the regulator being so arranged that the variations of such control voltage are of variable sign but of magnitude independent of the magnitude of the variations of the operating conditions of the main valve. When several valves are utilized in a polyphase connection, the flow of current through the associated auxiliary valves is preferably commutated therebetween by a commutating capacitor operating in connection with an inductive winding to increase the range of regulation obtainable therewith. Such result may also be obtained by rendering the auxiliary valves operable to invert direct current into alternating current.

It is therefore one of the objects of the present invention to provide an electric valve control system by which the control electrode of each valve receives an alternating potential component of substantially rectangular wave form in relation with the flow of current through an auxiliary electric valve.

Another object of the present invention is to provide an electric valve control system by which the control electrode of each valve receives a unidirectional potential component from a resistor receiving a substantially uniform unidirectional current from an auxiliary electric valve.

Another object of the present invention is to provide an electric valve control system by which the control electrodes of the valve are energized from circuit including an auxiliary valve regulated by the action of a control electrode.

Another object of the present invention is to provide an electric valve control system by which the valve may be rendered non-conductive by maintaining the control electrode thereof energized from a capacitor charged by means of auxiliary valves.

Another object of the present invention is to provide an electric valve control system by which the conductivity of the valve may be regulated by impressing on the control electrode thereof a potential having variations of sign dependent upon the variations of the condition to be regulated and of magnitude independent of the variations of such condition.

Figure 2:
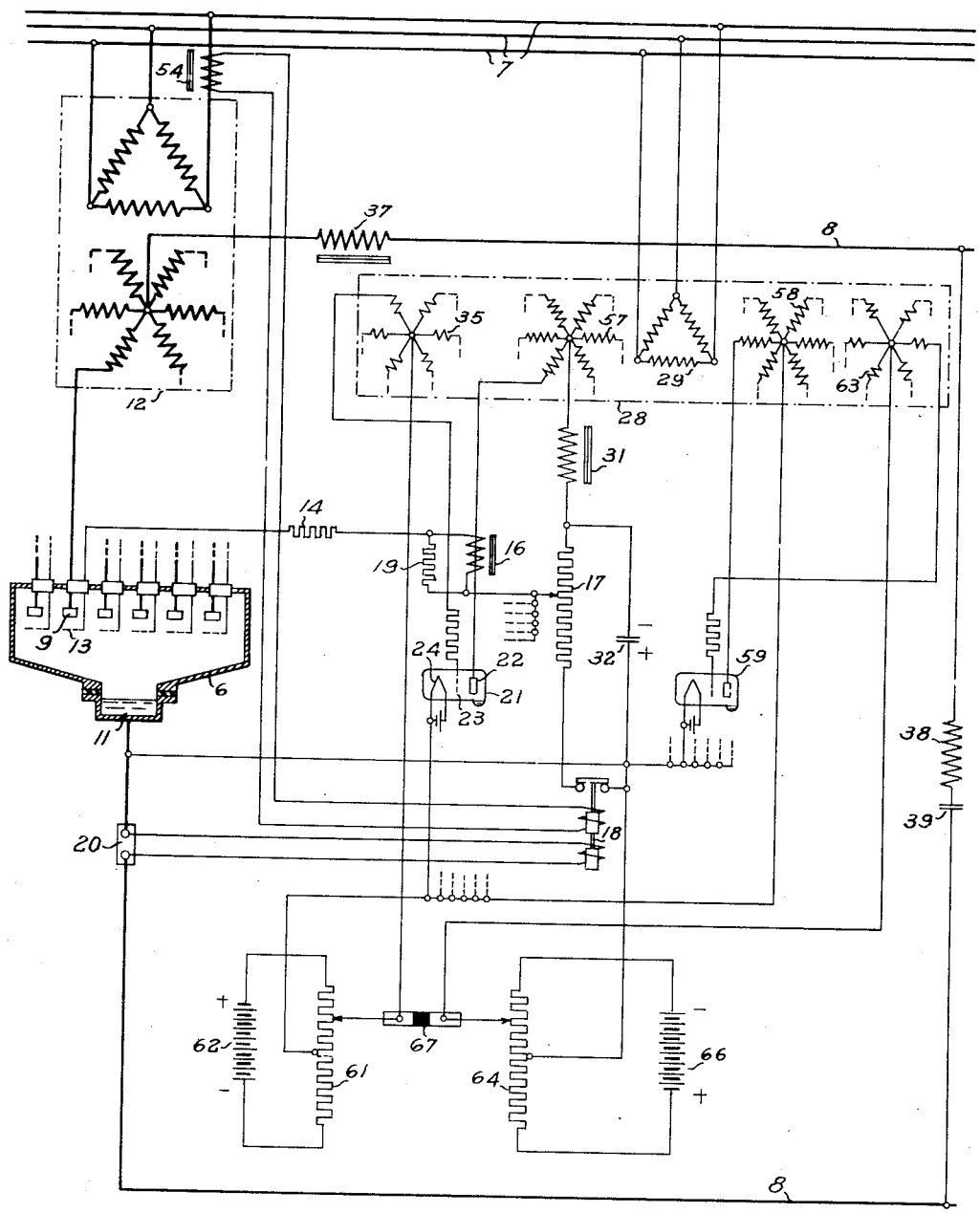
Figure 3:
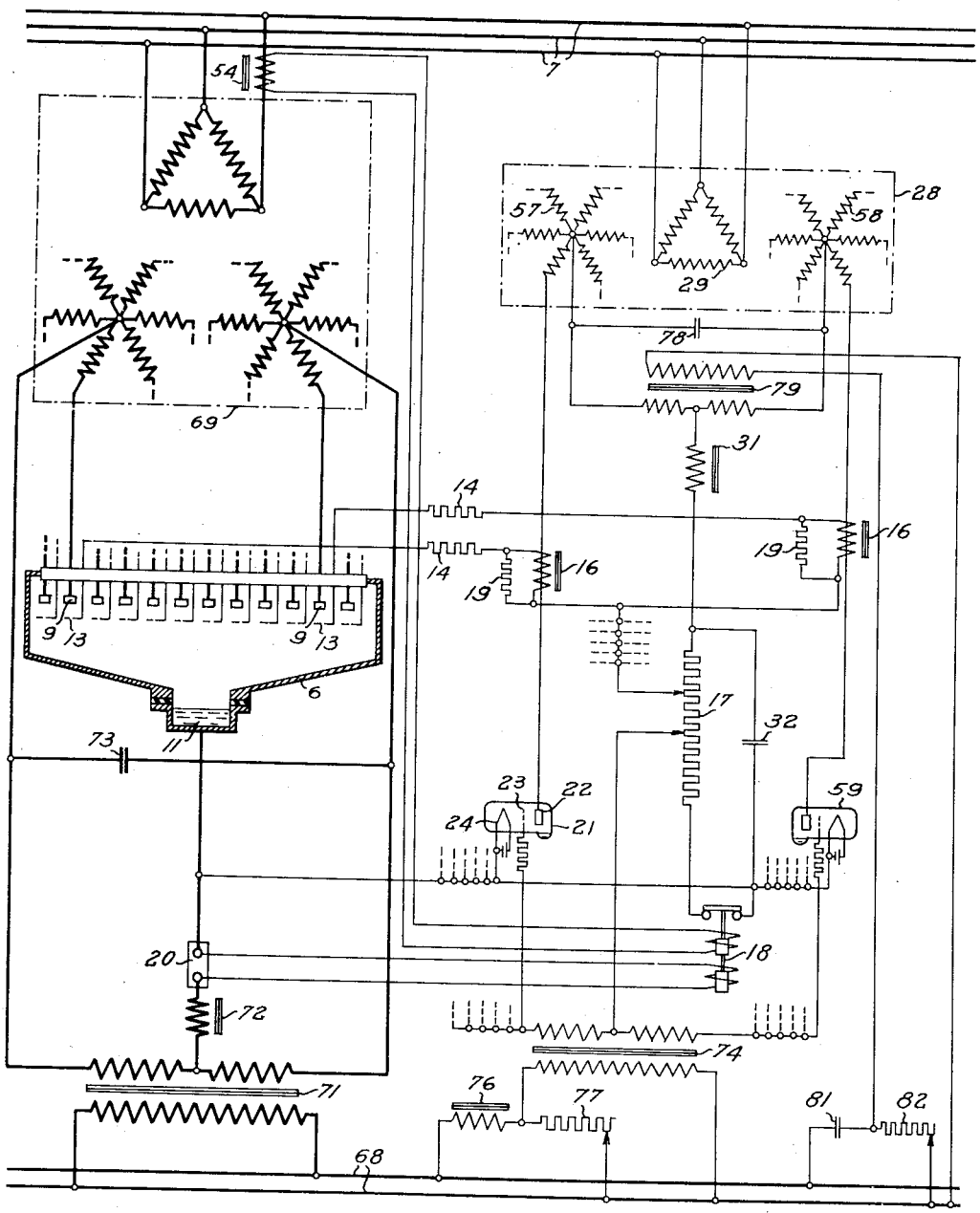

Objects and advantages other than those above set forth will be apparent from the following description when read in connection with the accompanying drawings, in which:

Fig. 1 diagrammatically illustrates one embodiment of the present invention applied to the control of an alternating current rectifying system, in which the flow of current through a plurality of auxiliary valves is commutated by a capacitor to increase the range of the regulation of the main valves;

Fig. 2 diagrammatically illustrates a modified embodiment of the present invention applied to the control of an alternating current rectifying or direct current inverting system, in which the auxiliary valves may each function for rectifying alternating current or for inverting direct current to increase the range of regulation of the main valves; and Fig. 3 diagrammatically illustrates a further modified embodiment of the present invention applied to the control of a frequency changing system.

It will be understood that elements of any of the embodiments herein illustrated may be also utilized in combination with elements of the other embodiments to form further embodiments of the present invention.

Referring more particularly to the drawings by characters of reference, reference numeral 6 generally designates a valve structure constituting part of a translating system utilized for controlling the flow of energy in either direction between two electric circuits or lines 7 and 8 of different electrical characteristics. Valve structure 6 may be of any of the types known in the art, and is herein illustrated as consisting of a so-called rectifier comprising a plurality of valves severally provided with anodes 9, combined into a single structure and having the cathodes thereof joined into a single cathode structure 11. Cathode 11 is provided with the usual means for bringing such cathode into electron emitting condition and for maintaining the cathode in such condition, such means being well known and therefore not shown. It will be understood that each of the valves may also be provided with a separate cathode enclosed with the associated anode in a separate casing.

Lines 7 and 8 may carry current of any desired form, the translating system being arranged in a suitable manner depending upon the nature of the current to be transmitted therethrough. In the embodiment illustrated in Fig. 1, line 7 is assumed to be a polyphase alternating current line and line 8 a direct current line. Line 7 is accordingly connected with anodes 9 through a transformer 12, cathode 11 being connected with one of the conductors of line 8 while transformer 12 is connected with the other conductor thereof.

The conductivity of the valves 6 is controlled by means of control electrodes 13 severally associated with anodes 9. It will be assumed that valves 6 are of the discontinuously controllable type, the control electrode of each valve being operable to prevent the flow of current therethrough when the control electrode is at a potential below the so-called critical potential which varies about the value of the potential of cathode 11. Each control electrode releases the flow of current through the valve of which it is a part when such electrode is above such critical potential, but is ineffective to continuously regulate the magnitude of such current during the flow thereof.

Control electrodes 13 are severally connected with cathode 11 through circuits each comprising a resistor 14, the secondary winding of a current transformer 16 and an adjustable portion of a resistor 17 common to all such circuits. A relay 18 having contacts connecting resistor 17 with cathode 11 is caused to operate upon an occurrence of a disturbance in the operation of valves 6, which may be a backfire in such valves, by means of current transformer 54 connected between transformer 12 and line 7. Such current transformer may also cause operation of the relay 18 upon occurrence of a short circuit in line 8, but a more rapid operation of the relay is obtained by energizing a second coil of the relay from a shunt 20 connected in one of the conductors of line 8. The secondary winding of each transformer 16 is preferably bridged by a resistor 19 to limit the output terminal voltage thereof. The primary windings of current transformers 16 are severally connected in series with the operating circuits of a plurality of auxiliary valves 21, which are preferably of the discontinuously controllable type. Each valve 21 may be provided with an anode 22 with an associated control electrode 23 and a cathode 24, the several cathodes 24 being jointly connected with cathode 11, or the several auxiliary valves may each form a part of a valve structure similar to valve structure 6 provided with a common cathode.

Valves 21 severally receive current from the phase displaced portions of secondary windings 26 and 27 of an auxiliary transformer 28 having a primary winding 29 connected with line 7. Transformer 28 may be constructed as a phase shifter to permit adjusting the phase relations between windings 26 and 27 and winding 29, and may also be provided with further windings as may be required. Valves 21 and transformer 28 constitute an alternating current rectifying system, current flowing through the phase portions of windings 26 and 27 being converted by valves 21 into a flow of unidirectional current returning to such windings through resistor 17. Such current is substantially uniform if a large number of valves 21 are utilized, but the uniformity thereof is preferably further increased by connecting a reactor 31 in series with resistor 17 and by connecting a capacitor 32 in parallel with the resistor.

As control electrodes 13 carry current which must be supplied thereto through valves 21, each control electrode circuit of the valves 6 constitutes, for one of valves 21, a load circuit connected across a portion of resistor 17 through the secondary winding of one of the current transformers 16. The voltages impressed on such load circuits may be varied by controlling the conductivity of valves 21, as will appear hereinafter. The flow of current through windings 26 and 27 is commutated between the successively operating phase portions of such windings by the action of a capacitor 33 cooperating with an interphase transformer 34. The conductivity of valves 21 is controlled by impressing suitable control potentials between the control electrode and the cathode of each such valve. Such voltages are preferably produced by a winding 35 of transformer 28 having a plurality of phase displaced portions forming a neutral point connected with cathodes 24 through a battery 36.

A translating system, connected and controlled as above described, is operable to transmit energy between lines 7 and 8 in the one or in the other direction of flow depending upon the relative adjustment of transformers 12 and 28. It will be assumed that the system transmits energy from line 7, constituting an input circuit therefor, to line 8 constituting an output circuit. The flow of current through line 8 is preferably rendered substantially uniform by means of a reactor 37 serially connected with such line, the effect of such reactor being preferably increased by connecting across line 8 one or more suitable filtering elements each comprising a reactor 38 connected in series with a capacitor 39.

The voltage of line 8 is preferably regulated by means of a static regulator generally designated by 41 impressing a variable voltage component between the cathodes and the control electrodes of valves 21 in response to the variation of an operating condition of line 8 which is the voltage thereof. To obtain such result, the voltage of line 8 is compared with that of a battery 42 connected with the negative conductor of line 8. The positive terminal of battery 42 is connected with the control electrode of a valve 43, which is preferably of the high vacuum type, having the cathode thereof connected with the positive conductor of line 8 through a voltage divider 44. Valve 43 controls the flow of current through a circuit comprising a battery 46 and a voltage divider 47. One portion of voltage divider 47 is connected between the control electrode and the cathode of another valve 48 of the high vacuum type, controlling the flow of current between a battery 49 and voltage divider 44. The negative terminal of voltage divider 44 is connected with the neutral point of winding 35 through battery 36.

If it is desired to increase the sensitivity of the regulator, battery 36 may be connected with the positive conductor of line 8 through the output circuit of an amplifier of any suitable known type having the input circuit thereof connected between the negative terminal of battery 49 and the positive conductor of line 8. As an alternative, an amplifier may be inserted in the connection between battery 42 and the control electrode of valve 43. The speed of response of the regulator may be adjusted by insertion of capacitors 51 and 52 between the control electrodes and the cathodes of valves 43 and 48, and of a capacitor 53 across a portion of voltage divider 44.

In operation, line 7 being energized, cathode 11 is rendered operative by the operation of the usual discharge igniting and maintaining means thereof, and valves 6 are then operative to carry current under the control of the control electrodes 13. Windings 26 and 27 of transformer 28 impress a polyphase system of voltages between the anode 22 and the cathode 24 of each of valves 21. Such valves accordingly carry current in sequence, the consecutive currents of the several valves flowing in unidirection through resistor 17, thereby causing the appearance of a unidirectional voltage across the terminal of such resistor. The flow of current through each valve 21 is released by the action of the control electrode 23 thereof at a point of the voltage cycle of line 7 determined by the phase relation of windings 26, 27 and 29, and by the relative magnitude of the voltages of winding 35, of battery 36, and of the negative portion of voltage divider 44.

If interphase transformer 34 and capacitor 33 are first assumed to have been omitted, the top of battery 36 may be moved to cause the flow of current through valve 21 to occur, at the earliest, at the moment of flow which would be obtained with valves not provided with control electrodes. The flow of current through valves 21 and through resistor 17 is then at a maximum value. Each control electrode 13 of valves 6 then receives a negative unidirectional potential equal to the voltage across the positive portion of resistor 17, and receives, once during every cycle of the voltage of line 7, a potential impulse of amplitude in relation with the magnitude of the flow of current through the associated current transformer 16 and through the associated valve 21. Although each valve 21 carries current under an impressed voltage which is represented by peak portions of a sine wave, the current through resistor 17 may be considered as uniform as a result of the action of reactor 31 and of capacitor 32, so that the current impulses of each valve 21 are of substantially uniform height and are therefore of substantially rectangular wave shape, neglecting the short periods of overlap between the current impulses flowing through the successively operating valves. The secondary winding of each current transformer 16 then carries a current proportional to the current in the primary winding thereof but displaced with respect to the time axis, such current flowing through the associated resistor 19 and causing the appearance, at the terminals thereof, of a voltage of substantially rectangular wave shape. Each control electrode 13 thus receives, from the associated current transformer 16, an alternating potential component of substantially rectangular wave shape consisting of alternate positive and negative rectangular potential impulses with respect to the potential of cathode 11 taken as datum.

The effect of regulator 41 on the operation of valves 21 may be determined by assuming, for the sake of convenience, that the tap of battery 36 is displaced to simulate the appearance of a variable voltage across the voltage divider 44. If the tap of battery 36 is moved to the right to increase the negative unidirectional potential component impressed thereby on the control electrodes 23 of valves 21, the flow of current through each valve is delayed with respect to the voltage cycle of line 7 as is well known; the potential impulses impressed on control electrodes 13 are delayed to the same extent, whereby the flow of current through valves 6 is likewise delayed to decrease the voltage impressed on line 8 by the secondary phase portions of transformer 12 through valves 6. Each valve 21 then carries current under a voltage represented by portions of a sine wave which no longer coincide with the peak portions thereof. The value of the rectangular current carried by each valve 21 decreases proportionally to the decrease of the average voltage under which such current flows, and the potential impulses impressed on control electrodes 13 by current transformers 16 decrease to the same extent. The voltage appearing across resistor 17 and the unidirection potential component impressed therefrom on control electrodes 13 decrease similarly. As, however, the positive potential impulses impressed by current transformers 16 on control electrodes 13 need not only neutralize the negative potential component impressed on the control electrodes from resistor 17 but must also raise such control electrodes to a potential materially higher than the more or less indefinite critical potential of valves 6, it is necessary that the secondary voltage of transformers 16 remain greater than a predetermined value.

If the tap of battery 36 is moved to an extent such that the flow of current through valves 21 is retarded by 60°, the voltage appearing across resistor 17 and the secondary voltages of current transformers 16 will reach only one-half of the maximum values thereof, so that the control potentials obtained by retarding such flow of current by more than 60° will generally be inadequate. Such disadvantage is remedied by the use of interphase transformer 34 in connection with capacitor 33. Such elements permit advancement of the periods of current flow through valves 21 by decreasing the amount of battery 36 in the circuit of control electrodes 23, the charge and discharge of capacitor 33 commutating the flow of current between windings 26 and 27 in opposition to the voltage impressed across valves 21 from such windings. In this manner, the periods of current flow through valves 21 may be advanced as well as retarded with respect to the periods of current flow obtainable without the use of control electrodes, so that the range of variation of such periods may be considerably increased without causing the magnitude of the potential impulses impressed on control electrodes 13 to decrease to an excessive extent. It will be understood that the phase relation of transformers 12 and 28 must be so chosen that the voltage of line 8 may reach the maximum value desired therefor when the periods of current flow through valves 21 are advanced to the maximum extent contemplated.

The actual operation of regulator 41 will now be considered assuming that the voltage of line 8 is at first equal to the voltage of battery 42. The control electrode of valve 43 is then at the potential of the positive conductor of line 8 and valve 43 permits a predetermined amount of current to flow from battery 46 through voltage divider 47. Such current causes a voltage drop in voltage divider 47, from which the negative voltage is impressed between the cathode and the control electrode of valve 48. Valve 48 then permits a predetermined amount of current to flow from battery 49 through voltage divider 44. The voltage drop in the negative portion of voltage divider 44 constitutes a negative potential component which is added to the voltage of battery 36 to form the unidirectional potential component impressed on the control electrodes of valves 21. The voltage drop in the positive portion of voltage divider 44 raises the potential of the cathode of valve 43 above the potential of the positive conductor of line 8 by a predetermined amount.

If the voltage of line 8 decreases below the value desired therefor, the potential of the cathode of valve 43 is lowered with respect to that of the associated control electrode, and the conductivity of valve 43 is accordingly increased. The flow of current through such valve increases, thus increasing the negative voltage impressed between the cathode and the control electrode of valve 48. The conductivity of such valve accordingly decreases, thus decreasing the flow of current through voltage divider 44. The voltage drop in voltage divider 44 then decreases with the result that the negative unidirectional potential component impressed on control electrodes 23 of valves 21 is decreased, thereby causing the flow of current through valves 21 and through valves 6 to be advanced to raise the voltage of line 8. At the same time, the decrease in the voltage drop in the positive portion of voltage divider 44 lowers the potential of the cathode of valve 43 thus enhancing the decrease of the voltage of line 8 on the operation of such valve and of valve 48. The flow of current through valve 43 thus continues to increase and the flow of current through valve 48 continues to decrease at a rate determined by the value of capacitors 51, 52, and 53. The negative voltage impressed by voltage divider 44 on the control electrodes of valves 21 continues to decrease until the voltage of line 8 is raised to an extent such as to exceed the voltage of battery 42. At such time, the potential of the cathode of valve 43 is raised sufficiently with respect to the potential of the associated control electrode to cause the conductivity of valve 43 to decrease with the result that the above described sequence of operation is reversed. The voltage of line 8 is thus caused to decrease below the value desired therefor, and the cycle of operation of regulator 41 is repeated. The flow of current through voltage divider 44 thus oscillates between a maximum and a minimum value, the potential across the negative portion of voltage divider 44 thus presenting variations of signs depending upon the momentary sign of the departure of the voltage of line 8 from the desired value. By inserting the positive portion of voltage divider 44 in the control electrode circuit of valve 43, the magnitude of such voltage variations is rendered independent of the magnitude of the variations of the voltage of line 8.

As the action of the control electrodes of valves 6 is an intermittent action limited to releasing the flow of current through the associated anodes at predetermined intervals, the operation of such control electrodes requires a material time, which may be as large as the operating period of each anode 9, for responding to the action of regulator 41. Capacitors 51, 52 and 53 are therefore so adjusted that the natural period of operation of regulator 41 is longer than the operating period of each anode 9. The voltage of line 8 is then constantly maintained in oscillation about the desired value, each action of regulator 41 to raise the voltage of line 8 resulting in such voltage overreaching the desired value and being afterward decreased below the desired value. For a predetermined adjustment of the taps of voltage dividers 47 and 44, the voltage of line 8 may be maintained in oscillation about a constant value regardless of the value of the voltage of line 7 and of the flow of current through valves 6, thus imparting to the valves a flat output voltage characteristic. By changing the adjustment of the voltage dividers, such characteristic may be caused to become rising or drooping to an adjustable extent.

During the normal operation of valves 6 considered above, valves 21 charge capacitor 32 to a voltage equal to the voltage appearing across resistor 17. Upon occurrence of a disturbance in the circuits associated with valves 6, such as a short circuit in line 8 or a backfire in valves 6, the flow of current through current transformer 54, or through shunt 29, or through both, reaches a sufficient value to cause operation of relay 18, and relay 18 interrupts the flow of current from valves 21 to resistor 17. Current transformers 16 and resistor 17 then being without current, control electrodes 13 receive only a negative potential from the negative terminal of capacitor 32, such potential being equal to the voltage at which such capacitor was charged. Control electrodes 13 accordingly prevent any further transfer of the flow of current from one anode 9 to another of the valves 6, and the flow of current through such valves accordingly ceases.

During such interruption of the flow of current through valves 6, control electrodes 13 may carry a small amount of current due to the release thereon of the charges of vapor ions of the valves, such current tending to cause the gradual discharge of capacitor 32. Such capacitor is however maintained charged by valves 21, the flow of charging current for the capacitor through such valves and through current transformers 16 being however insufficient to cause the impression of effective positive potential impulses on control electrodes 13. The contacts of relay 18 need not be connected as shown, but may be connected at another point of the circuit resistor 17, for example, between reactor 31 and interphase transformer 34 although the connection shown is preferred as it avoids discharge of the capacitor through resistor 17 upon operation of relay 18. Relay 18 is herein illustrated as being of the electromagnetic type, but it will be understood that an electronic relay, such as an electric valve, may be utilized instead for the same purpose.

In the embodiment illustrated in Fig. 2, valves 6 are assumed to be required to transmit energy in either direction of flow between lines 7 and 8, thus requiring a wide range of variation for the operating periods of anodes 9 relative to the voltage cycle of line 7. In the present embodiment, windings 26 and 27 of transformer 28 are joined at the neutral points thereof to form a single winding 57, capacitor 33 and interphase transformer 34 being omitted. Only one of the valves 21 is illustrated to simplify the drawings, and the cathodes 24 of such valves are connected with resistor 17 and capacitor 32 through a direct current inverting system comprising a winding 58 of transformer 28 similar to winding 57 and a plurality of valves 59 similar to valves 21. The conductivity of valves 21 is controlled by winding 35 and by a voltage divider 61 energized from a battery 62. A fixed tap of voltage divider 61 is connected with cathodes 24, and a movable tap thereof is connected with the neutral point of winding 35. The conductivity of valves 59 is controlled by a winding 63 of transformer 28 and by another voltage divider 64 energized from a battery 66. The movable taps of voltage dividers 61 and 64 are arranged to be jointly moved by an insulating member 67 actuated either manually or by automatic control means.

In operation, member 67 being assumed to be substantially in the position shown, transformer 28 and valves 21 rectify current received from line 7 and supply the rectified current to resistor 17 as in the embodiment illustrated in Fig. 1, except that in the present embodiment the flow of current through the several valves 21 cannot be advanced with respect to the periods of flow obtainable in valves without control electrodes. The phase relation of windings 58 and 63 is so adjusted that each control electrode of valves 59 becomes positive with respect to the associated cathode while the associated anode receives from winding 58, a negative potential with respect to the potential of the neutral point of such winding. Valves 59 and winding 58 are then operable to reconvert a portion of the energy delivered by valves 21 into alternating current which is returned to line 7 by windings 58 and 29.

By moving member 67 downward, the positive potential component received by control electrodes 23 from voltage divider 61 decreases thus causing the periods of current flow through valves 21 to be retarded. At the same time, the negative potential component received by the control electrodes of valves 59 from voltage divider 64 is also decreased thus causing the periods of current flow through valves 59 to be advanced. When member 67 reaches a predetermined position, valves 59 no longer function for inverting direct current into alternating current and, instead, assist valves 21 in supplying rectified current to resistor 17. Further movement of member 67 causes the periodic flow of current through valves 59 to gradually advance to supply current to resistor 17 at an increasing voltage; the periods of current flow through valves 21 are gradually retarded to first decrease the voltage under which current is supplied through such valves to resistor 17, and thereafter cause valves 21 to reconvert an increasing amount of the energy supplied to resistor 17 through valves 59 into alternating current which is returned to line 7 through windings 57 and 29. The flow of energy through valves 21 and 59 is thus reversed when member 67 is moved from the one extreme position thereof to the other extreme position.

During such operation, the periods of flow of current through valves 21 are gradually retarded through the range utilized during the rectifying operation and through the range utilized during the inverting operation of such valves, whereby the potential impulses impressed on control electrodes 13 of valves 6 may be caused to occur at widely variable moments of the voltage cycle of line 7. The magnitude of the flow of current through resistor 17 depends at every instant on the relative values of the unidirectional potential components impressed on the control electrodes of valves 21 and 59 by voltage dividers 61 and 64. The resistance of such voltage dividers is preferably so distributed over the length thereof that the flow of current through resistor 17 is caused to remain at a substantially constant value for all positions of member 67. The negative potential component impressed on control electrodes 13 from resistor 17 is then substantially constant and the potential impulses impressed on such control electrodes by current transformers 16 are also substantially constant in magnitude thereby insuring correct operation of valves 6 for all adjustments of member 67.

In the embodiment illustrated in Fig. 3, valves 6 are assumed to be double in number of the number of valves illustrated in Figs. 1 and 2 to serve for converting current between line 7 and a single phase alternating current line or circuit 68. As is well known, the anodes 9 of valves 6 may then be connected with line 7 through a transformer 69 having two secondary windings provided with neutral points severally connected to the terminals of the primary winding of a transformer 71 having a secondary winding connected with line 68. A midtap of the primary winding of transformer 71 is connected with cathode 11 through a conductor carrying unidirectional current and which may therefore receive shunt 20. The voltage impressed on line 68 by valves 6 may be rendered substantially sinusoidal by inserting a reactor 72 in the connection between cathode 11 and transformer 71, such reactor cooperating with a capacitor 73 connected across the primary winding of transformer 71. In the present embodiment, although valves 21 are connected as illustrated in Fig. 1 and valves 59 are connected in a similar manner, winding 57 and valves 21 are caused to operate during one-half of each cycle of the voltage of line 68; winding 58 and valves 59 operating during the other half of such cycle, whereby resistor 17 receives a substantially uniform flow of current alternately from valves 21 and 59. Such result is obtained by connecting the control electrodes of all valves 21 and the control electrodes of all valves 59 with the terminals of the secondary winding of a control transformer 74, such winding having a midtap connected with a suitable point of resistor 17. The primary winding of transformer 74 is connected with line 68, such connection including suitable means for adjusting the phase relation of transformer 74 and of line 68, such as a reactor 76 and a resistor 77. The flow of current between windings 57 and 58 is commutated by a capacitor 78 cooperating with a transformer 79 energized from line 68. The voltage of transformer 79 is caused to be suitably displaced in phase with respect to the voltage of line 68 by connecting transformer 79 with line 68 through suitable phase shifting means such as a capacitor 81 and a resistor 82. Current transformers 16 are provided in number sufficient to permit one such current transformer to be inserted in series with each valve 21 and with each valve 59.

The operation of valves 6 in connection with transformers 69 and 71 is well known, current being carried alternately by the one and the other secondary windings of transformer 69 and through the valves associated therewith, such current flowing alternately through the two portions of the primary winding of transformer 71 to induce alternate half waves of current in the secondary winding thereof. During each such half wave, a plurality of valves 6 associated with the portions of one of the secondary windings of transformer 69 sequentially carry current during intervals determined by the frequency of the voltage of line 7 and by the number of phase portions of transformer 69. The flow of current through all valves 6 combines at cathode 11 to form a flow of substantially uniform direct current between such cathode and the primary winding of transformer 71.

Valves 21 and 59 function in a manner similar to the manner in which valves 6 operate, except that the energy delivered thereby is utilized in the form of direct current in resistor 17 instead of being converted into alternating current through an output transformer. The flow of current through resistor 17 is caused to alternate between winding 67 and valves 21 and through winding 58 and valves 59 by the action of transformer 74. As the control electrodes of valves 21 and 59 are operable to release the flow of current through such valves but not to interrupt such flow of current, one of the valves 21, for example, will tend to continue to carry current when the potential of the control electrode thereof is depressed to render such valve non-conductive, while one of the valves 59 is rendered conductive. To obtain an accurate control of the flow of current through the valve 21 then operating, such flow of current is then caused to cease by the action of transformer 79 and capacitor 78, which causes the voltage between the anode and cathode of such valve to reverse thereby enabling the control electrode of the valve to regain control. Similarly, when valves 21 are made conductive by the action of transformer 74, the last valve 59 then operating is caused to cease carrying current by the action of transformer 79 and capacitor 78. The groups of current transformers 16 serially connected with valves 21 and 59 then alternately impress groups of potential impulses on the control electrodes of valves 6 to cause the flow of current through such valves to occur in the desired sequence. The action of relay 18 to cause interruption of the flow of current through valves 6 is similar to the action of such relay in the previously described embodiment.

Although but a few embodiments of the present invention have been illustrated and described, it will be understood that various other embodiments are possible, and that various other changes may be made without departing from the spirit of the invention or the scope of the claims.

It is claimed and desired to secure by Letters Patent:

1. In an electric translating system, an electric valve having an anode with an associated control electrode and a cathode, an input circuit and an output circuit for said valve, one of said circuits being an alternating current circuit, a resistor, an auxiliary valve for supplying a substantially uniform rectified current to said resistor from said alternating current circuit, and means for controlling the operation of the first said valve including means for impressing on the control electrode thereof a potential component equal to the voltage across a portion of said resistor and another potential component proportional to the current through said auxiliary valve.

2. In an electric translating system, an electric valve having an anode with an associated control electrode and a cathode, an input circuit and an output circuit for said valve, one of said circuits being an alternating current circuit, a resistor, an auxiliary valve for supplying a substantially uniform rectified current to said resistor from said alternating current circuit, means for controlling the operation of the first said valve including means for impressing on the control electrode thereof a potential component equal to the voltage across a portion of said resistor and another potential component proportional to the current through said auxiliary valve, and means for controlling the conductivity of said auxiliary valve to vary one of the potential components.

3. In an electric translating system, an electric valve having an anode with an associated control electrode and a cathode, an input circuit and an output circuit for said valve, one of said circuits being an alternating current circuit, a resistor, an auxiliary valve connecting said resistor with said alternating current circuit for supplying rectified current to said resistor, a capacitor connected across said resistor for rendering the flow of current therethrough substantially uniform, means for connecting the control electrode and the cathode of the first said valve with said resistor for impressing a potential component therefrom on the control electrode, and means for disconnecting said resistor from said auxiliary valve to cause said capacitor to impress another potential on the control electrode.

4. In an electric translating system, an electric valve having an anode with an associated control electrode and a cathode, an input circuit and an output circuit for said valve, one of said circuits being an alternating current circuit, a resistor connected with the cathode of said valve, an auxiliary valve connecting said resistor with said alternating current circuit for supplying rectified current to said resistor, a capacitor connected with said cathode and with said resistor for smoothing the flow of current through said resistor, a current transformer having a primary winding in series with said auxiliary valve and having a secondary winding connected between the control electrode of the first said valve and a point of said resistor, and means for controlling the output voltage of said current transformer including means for controlling the conductivity of said auxiliary valve.

5. In an electric translating system, an electric valve having an anode with an associated control electrode and a cathode, an input circuit and an output circuit for said valve, one of said circuits being an alternating current circuit, a resistor connected with said cathode, an auxiliary valve connecting said resistor with said alternating current circuit for supplying rectified current to said resistor, a capacitor connected with the cathode of the first said valve and with said resistor for smoothing the flow of current through said resistor, a current transformer having a primary winding in series with said auxiliary valve and having a secondary winding connected between the control electrode of the first said valve and a point of said resistor, and means for interrupting the flow of current through said resistor.

6. In an electric translating system, an electric valve having an anode with an associated control electrode and a cathode, an input circuit and an output circuit for said valve, one of said circuits being an alternating current circuit, a resistor connected with the cathode of said valve, an auxiliary valve connecting said resistor with said alternating current circuit for supplying rectified current to said resistor, a capacitor connected with said cathode and with said resistor for smoothing the flow of current through said resistor, a current transformer having a primary winding in series with said auxiliary valve and having a secondary winding connected between the control electrode of the first said valve and a point of said resistor, means for controlling the output voltage of said current transformer including means for controlling the conductivity of said auxiliary valve, and means for interrupting the flow of current through said resistor.

7. A system for generating a periodic potential comprising an alternating current supply circuit, a resistor, an electric valve connecting said resistor with said circuit, means for rendering the flow of current through said resistor substantially uniform, a current transformer having a primary winding serially connected with said valve and having a secondary winding, and a load circuit connected across a portion of said resistor through said secondary winding.

8. A system for generating a periodic potential comprising an alternating current supply circuit, a resistor, an electric valve connecting said resistor with said circuit, means for rendering the flow of current through said resistor substantially uniform, a current transformer having a primary winding serially connected with said valve and having a secondary winding, a load circuit connected across a portion of said resistor through said secondary winding, and means for controlling the conductivity of said valve to vary the voltage impressed on said load circuit.

9. A system for generating a periodic potential comprising an alternating current supply circuit, a resistor, a plurality of electric valves connecting said resistor with said circuit to cause a flow of substantially uniform rectified current through said resistor, a current transformer having a primary winding serially connected with one of said valves and having a secondary winding, and a load circuit connected across a portion of said resistor through said secondary winding.

10. A system for generating a periodic potential comprising an alternating current supply circuit, a resistor, a plurality of electric valves connecting said resistor with said circuit to cause a flow of substantially uniform rectified current through said resistor, a current transformer having a primary winding serially connected with one of said valves and having a secondary winding, a load circuit connected across a portion of said resistor through said secondary winding, and means for interrupting the flow of current through said resistor.

11. A system for generating a periodic potential comprising an alternating current supply circuit, a resistor, a plurality of electric valves connecting said resistor with said circuit to cause a flow of substantially uniform rectified current through said resistor, a current transformer having a primary winding serially connected with one of said valves and having a secondary winding, a load circuit connected across a portion of said resistor through said secondary winding, means for interrupting the flow of current through said resistor, and means for commutating the flow of current through said valves in opposition to the voltage impressed thereon from said supply circuit.

12. A system for generating a periodic potential comprising an alternating current supply circuit, a direct current circuit, a pair of electric valves interconnecting said circuits, a load circuit, means connecting said load circuit with one of said valves, means for controlling the conductivity of said valves to cause said one of said valves to transmit energy from said alternating current circuit to said direct current circuit and to cause the other one of said valves to transmit energy from said direct current circuit to said alternating current circuit, and means for adjusting the second said means operable to cause reversal of the flow of energy transmitted by said valves.

13. A system for generating a periodic potential comprising an alternating current supply circuit, a resistor, transformer means connected with said alternating current circuit, a pair of electric valves severally connecting said resistor with said transformer means through separate paths to cause a flow of substantially uniform rectified current through said resistor, a current transformer having a primary winding serially connected with one of said valves and having a secondary winding, a load circuit connected with said secondary winding, means for controlling the conductivity of said valves to periodically cause said valves to sequentially carry current, an inductive winding having two portions severally inserted in said paths, and a capacitor connected in parallel with said inductive winding to commutate the flow of current through said valves.

14. In an electric translating system, an electric valve having an anode with an associated control electrode and a cathode, an input circuit and an output circuit for said valve, one of said circuits being an alternating current circuit, means for controlling the conductivity of said valve including a static regulator having input connections responsive to the presence of variations in an electrical characteristic of said output circuit for producing a variable control voltage, and means for rendering the magnitude of the variations of the control voltage independent of the magnitude of the variations of the electrical characteristic.

15. In an electric translating system, an electric valve having an anode with an associated control electrode and a cathode, an input circuit and an output circuit for said valve, one of said circuits being an alternating current circuit, a resistor, a plurality of auxiliary valves severally connecting said resistor with different portions of said alternating current circuit for supplying rectified current to said resistor, and means for controlling the conductivity of the first said valve including means for impressing on said control electrode superimposed potential components including a component equal to the voltage across a portion of said resistor and another component proportional to the current in only one of said auxiliary valves.

16. In an electric translating system, an electric valve having an anode with an associated control electrode and a cathode, an input circuit and an output circuit for said valve, one of said circuits being an alternating current circuit, a resistor, a plurality of auxiliary valves severally connecting said resistor with different portions of said alternating current circuit for supplying rectified current to said resistor, means for controlling the conductivity of the first said valve including means for impressing on said control electrode superimposed potential components including a component equal to the voltage across a portion of said resistor and another component proportional to the current in only one of said auxiliary valves, and means including an element of each of said auxiliary valves and a source of potential for controlling the conductivity of said auxiliary valves to control the magnitudes of said potential components.

17. A system for generating a periodic potential comprising an alternating current supply circuit, a resistor, a pair of electric valves for connecting said resistor with said supply circuit, a load circuit, a current transformer having a primary winding serially connected with one of said valves and having a secondary winding connecting said load circuit across a portion of said resistor, means for controlling the conductivity of said valves to cause one of said valves to supply rectified current from said supply circuit to said resistor and to cause the other one of said valves to return a portion of the energy of said current to said supply circuit, and means for varying the adjustment of said controlling means to regulate the voltage of said load circuit.

18. A system for generating a periodic potential comprising an alternating current supply circuit, a resistor, a pair of electric valves for connecting said resistor with said supply circuit, a load circuit, a current transformer having a primary winding serially connected with one of said valves and having a secondary winding connecting said load circuit across a portion of said resistor, means for controlling the conductivity of said valves to cause one of said valves to supply rectified current from said supply circuit to said resistor and to cause the other one of said valves to return a portion of the energy of said current to said supply circuit, and means for varying the adjustment of said controlling means operable to cause the said functions of said valves resulting from the action of said controlling means to be interchanged between said valves.

19. In an electric current translating system, the combination with an alternating current supply circuit, an electric current load circuit, and electric valve means comprising an anode and a cathode interconnecting said circuits and constituting spaced electrodes for the flow of current therebetween, of means for controlling said flow of current comprising a control electrode constituting an element of said valve means, means comprising a resistor and an auxiliary electric valve coupling said supply circuit with said control electrode for impressing on the latter a potential component proportional to the flow of current through said auxiliary valve, and means for controlling the conductivity of said auxiliary valve in such sense as to produce variations in said potential component.

20. In an electric current translating system, the combination with an electric current supply circuit, an electric current load circuit, and electric valve means comprising an anode and a cathode interconnecting said circuits and constituting spaced electrodes for the flow of current therebetween, of means for controlling said flow of current comprising a control electrode constituting an element of said valve means, a resistor connected with said cathode and control electrode, a plurality of auxiliary electric valves severally coupling different portions of said supply circuit with said resistor for impressing on said control electrode a potential component equal to the potential across at least a portion of said resistor, means for impressing another potential component on said control electrode comprising a current transformer having a primary winding serially included in the connections of one of said auxiliary valves with said supply circuit, and means for commutating the flow of current through the said auxiliary valves in opposition to the voltage impressed thereon from said supply circuit.

21. In an electric current translating system, the combination with an alternating current supply circuit, an electric current load circuit, and electric valve means comprising an anode and a cathode interconnecting said circuits and constituting spaced electrodes for the flow of current therebetween, of means for controlling said flow of current comprising a control electrode constituting an element of said valve means, a resistor connected with said cathode and with said control electrode, a plurality of auxiliary electric valves severally coupling said resistor with different portions of said supply circuit for supplying rectified current to said resistor for impressing on said control electrode a potential component equal to the potential across at least a portion of said resistor, means for impressing another potential component on said control electrode comprising a current transformer having a primary winding serially included in the connections of one of said auxiliary valves with said supply circuit, and means comprising an element of each of said auxiliary valves and a source of potential for controlling the conductivity of said auxiliary valves to control the magnitudes of said potential components.

22. In an electric current translating system, the combination with an electric current load circuit, of means for producing and impressing on said load circuit superimposed potential components comprising a source of alternating potential, a resistor, a plurality of electric valves connecting said source of alternating potential with said resistor for supplying a substantially uniform rectified potential to said resistor, a current transformer having a primary winding serially included in the connections of one of said valves with said source of alternating potential and having a secondary winding connecting said load circuit across a portion at least of said resistor, and means for commutating the flow of current through said valves against the potential impressed thereon from said source of alternating potential.

CHARLES EHRENSPERGER.